(12) United States Patent
Felderman et al.

(10) Patent No.: US 11,151,109 B2
(45) Date of Patent: *Oct. 19, 2021

(54) INDEXING AND ARCHIVING MULTIPLE STATEMENTS USING A SINGLE STATEMENT DICTIONARY

(71) Applicant: International Business Machines Corporation, Armonk, NY (US)

(72) Inventors: Gregory S. Felderman, Broomfield, CO (US); Brian K. Hoyt, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,291

(22) Filed: Dec. 12, 2017

(65) Prior Publication Data

US 2018/0144012 A1    May 24, 2018

Related U.S. Application Data

(63) Continuation of application No. 15/357,217, filed on Nov. 21, 2016.

(51) Int. Cl.
*G06F 16/00* (2019.01)
*G06F 16/22* (2019.01)

(52) U.S. Cl.
CPC ................. *G06F 16/2272* (2019.01)

(58) Field of Classification Search
CPC ......... G06F 17/30997; G06F 17/30011; G06F 17/30336; G06F 17/30312; G06F 17/30477; G06F 17/30964; G06F 8/71; G06F 8/75; G06F 16/2272

USPC ......... 707/705, 715, E17.014, E17.044, 600, 707/692, 706, 711, 769, 802

See application file for complete search history.

(56) References Cited

U.S. PATENT DOCUMENTS

| | | | | |
|---|---|---|---|---|
| 5,717,919 A | * | 2/1998 | Kodavalla | G06F 16/2282 |
| 5,983,171 A | * | 11/1999 | Yokoyama | G06F 17/30622 704/10 |
| 6,002,798 A | * | 12/1999 | Palmer | G06F 16/313 382/176 |
| 7,925,647 B2 | | 4/2011 | Das et al. | |
| 8,051,045 B2 | | 11/2011 | Vogler | |

(Continued)

OTHER PUBLICATIONS

Krathu et al.; "Data Mining Approach for Automatic Discovering Success Factors Relationship Statements in Full Text Articles", IEEE 8th International Conference On Advanced Computational Intelligence (ICACI), dated Feb. 14-16, 2016, Total 7 pages.

(Continued)

*Primary Examiner* — Shiow-Jy Fan
(74) *Attorney, Agent, or Firm* — Konrad, Raynes, Davda and Victor LLP; Janaki K. Davda (57) ABSTRACT

Provided are techniques for indexing and archiving multiple statements using a single statement dictionary in a document containing the multiple statements. A document comprising a statement dictionary and one or more statements is indexed by extracting a statement metadata corresponding to each of the one or more statements from the statement dictionary. Each statement metadata is stored in a database. In response to a search request for a statement, the statement is retrieved using the corresponding statement metadata.

6 Claims, 11 Drawing Sheets

(56) References Cited

U.S. PATENT DOCUMENTS

| | | | |
|---|---|---|---|
| 8,161,023 | B2 | 4/2012 | Felderman et al. |
| 8,245,203 | B2 | 8/2012 | Becker |
| 8,572,062 | B2 | 10/2013 | Felderman et al. |
| 8,825,629 | B2 | 9/2014 | Lawande et al. |
| 9,104,781 | B2 | 8/2015 | Fanning et al. |
| 9,110,769 | B2 | 8/2015 | Zhang et al. |
| 9,201,844 | B2 | 12/2015 | Guenkova-Luy et al. |
| 2003/0135495 | A1* | 7/2003 | Vagnozzi ............ G06F 16/2237 |
| 2005/0216421 | A1* | 9/2005 | Barry .................. G06F 11/0709 705/64 |
| 2006/0004725 | A1* | 1/2006 | Abraido-Fandino ........................ G06F 17/30864 |
| 2007/0050333 | A1* | 3/2007 | Vogler ............. G06F 17/30312 |
| 2007/0208696 | A1 | 9/2007 | Burger |
| 2007/0250531 | A1* | 10/2007 | Wiggins ............ G06F 17/30011 |
| 2007/0276868 | A1* | 11/2007 | Schlussler ......... G06F 17/30991 |
| 2008/0151284 | A1* | 6/2008 | Morales ................ G06F 3/1245 358/1.15 |
| 2008/0162603 | A1* | 7/2008 | Garg ..................... G06F 17/218 |
| 2008/0178120 | A1* | 7/2008 | Yamamoto .............. G06F 16/50 715/838 |
| 2008/0263032 | A1* | 10/2008 | Vailaya ............. G06F 17/30675 |
| 2009/0157711 | A1* | 6/2009 | Baer ................... G06F 17/3089 |
| 2010/0042633 | A1* | 2/2010 | Gotlieb ................... G06F 9/546 709/206 |
| 2010/0274781 | A1* | 10/2010 | Loofbourrow ...... G06F 16/2272 707/722 |
| 2011/0153640 | A1 | 6/2011 | Felderman et al. |
| 2014/0068544 | A1* | 3/2014 | Fanning ............ G06F 17/30964 717/100 |
| 2014/0156587 | A1 | 6/2014 | Momtchev et al. |
| 2014/0156669 | A1* | 6/2014 | Bati ........................ G06F 8/443 707/741 |
| 2014/0214882 | A1* | 7/2014 | Felderman .............. G06F 16/93 707/769 |
| 2014/0351008 | A1 | 11/2014 | Oyamatsu et al. |
| 2015/0032703 | A1 | 1/2015 | Sivashanmugam et al. |
| 2015/0066977 | A1* | 3/2015 | Wen .................. G06F 17/30439 707/769 |

OTHER PUBLICATIONS

Khedr et al.; "An Integration Framework for Search Engine Architecture to Improve Information Retrieval Quality", IEEE 2nd International Conference On Computer Technology and Development (ICCTD), dated Nov. 2-4, 2010, Total 5 pages.

Wei et al.; "Mapping Technique Of STEP Data Model In Relational Database Based On Data Storage", IEEE 2nd International Conference On Intelligent Networks and Intelligent Systems (ICINIS), dated Nov. 1-3, 2009, Total 4 pages.

Mell et al., "Effectively and Securely Using The Cloud Computing Paradigm", dated Oct. 7, 2009, NIST, Information Technology Laboratory, Total 80 pages.

Mell et al., "The NIST Definition of Cloud Computing", dated Sep. 2011, Recommendations of the National Institute of Standards and Technology, Total 7 pages.

US Patent Application, dated Nov. 21, 2016, for U.S. Appl. No. 15/357,217, filed Nov. 21, 2016, invented by Gregory S. Felderman et al., Total 34 pages.

Preliminary Amendment, dated Dec. 12, 2017, for U.S. Appl. No. 15/357,217, filed Nov. 21, 2016, invented by Gregory S. Felderman et al., Total 4 pages.

List of IBM Patents or Patent Applications Treated as Related, dated Dec. 12, 2017, pp. 2.

Office Action, dated Jan. 29, 2019, for U.S. Appl. No. 15/357,217, filed Nov. 21, 2016, invented by Gregory S. Felderman at al., Total 21 pages.

Response to Office Action, dated Apr. 19, 2019, for U.S. Appl. No. 15/357,217, filed Nov. 21, 2016, invented by Gregory S. Felderman et al., Total 8 pages.

Final Office Action, dated May 23, 2019, for U.S. Appl. No. 15/357,217, filed Nov. 21, 2016, invented by Gregory S. Felderman et al., Total 19 pages.

Response to Final Office Action, dated Aug. 23, 2019, for U.S. Appl. No. 15/357,217, filed Nov. 21, 2016, invented by Gregory S. Felderman et al., Total 9 pages.

Office Action, dated Dec. 3, 2019, for U.S. Appl. No. 15/357,217, filed Nov. 21, 2016, invented by Gregory S. Felderman at al., Total 24 pages.

Response to Office Action, dated Mar. 3, 2020, for U.S. Appl. No. 15/357,217, filed Nov. 21, 2016, invented by Gregory S. Felderman et al., Total 10 pages.

Final Office Action, dated Apr. 14, 2020, for U.S. Appl. No. 15/357,217, filed Nov. 21, 2016, invented by Gregory S. Felderman et al., Total 29 pages.

Response to Final Office Action, dated Jul. 14, 2020, for U.S. Appl. No. 15/357,217, filed Nov. 21, 2016, invented by Gregory S. Felderman et al., Total 12 pages.

Office Action, dated Sep. 23, 2020, for U.S. Appl. No. 15/357,217, filed Nov. 21, 2016, invented by Gregory S. Felderman et al., Total 22 pages.

Response to Office Action, dated Dec. 23, 2020, for U.S. Appl. No. 15/357,217, filed Nov. 21, 2016, invented by Gregory S. Felderman et al., Total 9 pages.

Final Office Action, dated Feb. 5, 2021, for U.S. Appl. No. 15/357,217, filed Nov. 21, 2016, invented by Gregory S. Felderman et al., Total 24 pages.

Response to Final Office Action, dated May 5, 2021, for U.S. Appl. No. 15/357,217, filed Nov. 21, 2016, invented by Gregory S. Felderman et al., Total 9 pages.

Notice of Allowance, dated Jun. 16, 2021, for U.S. Appl. No. 15/357,217, filed Nov. 21, 2016, invented by Gregory S. Felderman et al., Total 14 pages.

* cited by examiner

INDEXING AND ARCHIVING MULTIPLE STATEMENTS USING A SINGLE STATEMENT DICTIONARY

FIELD

Embodiments of the invention relate to indexing and archiving multiple statements using a single statement dictionary in a document containing the multiple statements. In particular, embodiments of the invention relate to an efficient mechanism for archiving statement data.

BACKGROUND

Document composition vendors are increasingly generating larger reports. A report may be for a medical billing company, and the report contains customer statements (e.g., billing statements). Although these reports once contained hundreds of thousands of customer statements, it is now common for these reports to contain millions of customer statements.

This has put a burden on the statement indexing engine responsible for identifying and archiving each of the customer statements. As the number of statements being generated in any one report grow, it is becoming increasingly harder to complete indexing and archival in a timely fashion.

Some indexing solutions render pages from the reports in memory and extract metadata via X, Y coordinates. Other indexing solutions navigate a page dictionary and extract metadata from each page from the reports. Both solutions carry a lot of overhead.

Document composition vendors know at the time of document construction all the values to be placed in the customer statement. For example, for a billing statement, the values may include a customer name and a billing amount. Some solutions take advantage of this knowledge and insert this metadata (the values) directly into a page dictionary. This page dictionary is used by statement indexing engines in determining the beginning and ending pages of a single customer statement. While more efficient than the indexing with X, Y text extraction, such solutions still require the statement indexing engine to navigate the entire report, opening and closing every page. This process involves opening, navigating, reading, and closing every page. For some data types, such as Advanced Function Presentation (AFP) and Portable Document Format (PDF), this can be very processor and memory intensive.

SUMMARY

Provided is a method for indexing and archiving multiple statements using a single statement dictionary in a document containing the multiple statements. The method comprises: indexing, with a processor of a computer, a document comprising a statement dictionary and one or more statements by extracting a statement metadata corresponding to each of the one or more statements from the statement dictionary; storing each statement metadata in a database; and, in response to a search request for a statement, retrieving the statement using the corresponding statement metadata.

Provided is a computer program product for indexing and archiving multiple statements using a single statement dictionary in a document containing the multiple statements. The computer program product comprises a computer readable storage medium having program code embodied therewith, the program code executable by at least one processor to perform: indexing a document comprising a statement dictionary and one or more statements by extracting a statement metadata corresponding to each of the one or more statements from the statement dictionary; storing each statement metadata in a database; and, in response to a search request for a statement, retrieving the statement using the corresponding statement metadata.

Provided is a computer system for indexing and archiving multiple statements using a single statement dictionary in a document containing the multiple statements. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: indexing a document comprising a statement dictionary and one or more statements by extracting a statement metadata corresponding to each of the one or more statements from the statement dictionary; storing each statement metadata in a database; and, in response to a search request for a statement, retrieving the statement using the corresponding statement metadata.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1A:
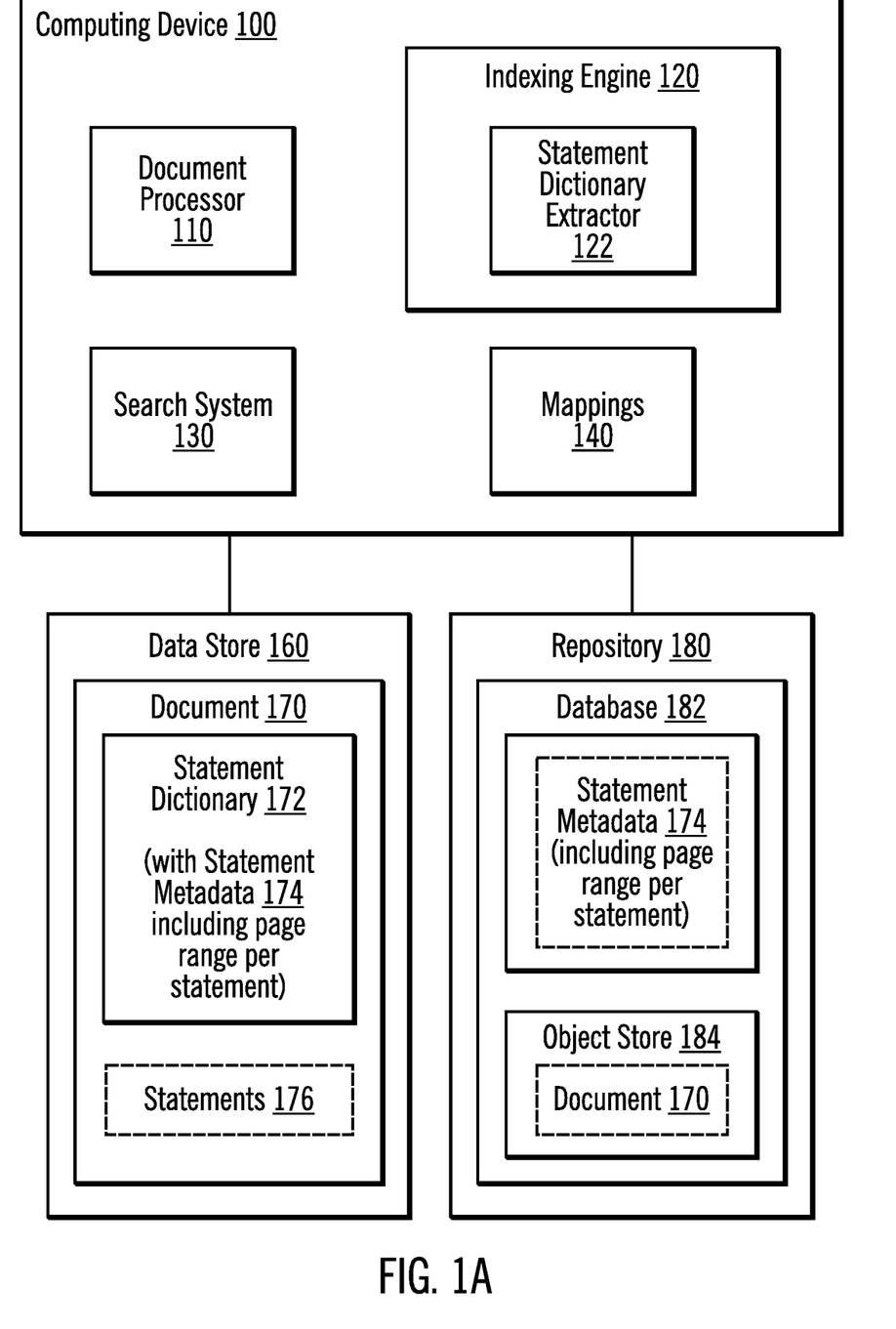
FIG. 1A illustrates, in a block diagram, a computing environment storing a document with a statement dictionary and statements in a repository in accordance with certain embodiments.

FIG. 1A illustrates, in a block diagram, a computing environment storing a document with a statement dictionary and statements in a repository in accordance with certain embodiments. A computing device 100 is coupled to a data store 160 and a repository 180. The computing device 100 includes a document processor 110, an indexing engine 120, a search system 130, and mappings 140. The indexing engine 120 includes a statement dictionary extractor 122. The data store 160 includes at least one document 170 that includes a statement dictionary 172 and statements 176 before the document 170 is indexed. The statement dictionary 172 includes statement metadata 174, including a page range for each of the statements 176. Moreover, the statement metadata 174 includes fields and values for each of the statements (e.g., a field may be a name of a customer, and the value is the customer's name). In certain embodiments, the statement metadata 174 is extracted and stored in a database 182 of the repository 180, while the entire document 170 (along with statement dictionary 172 and statements 174) is stored in the object store 184 of the repository 180. Such extraction may occur while indexing the document 170.

Figure 1B:
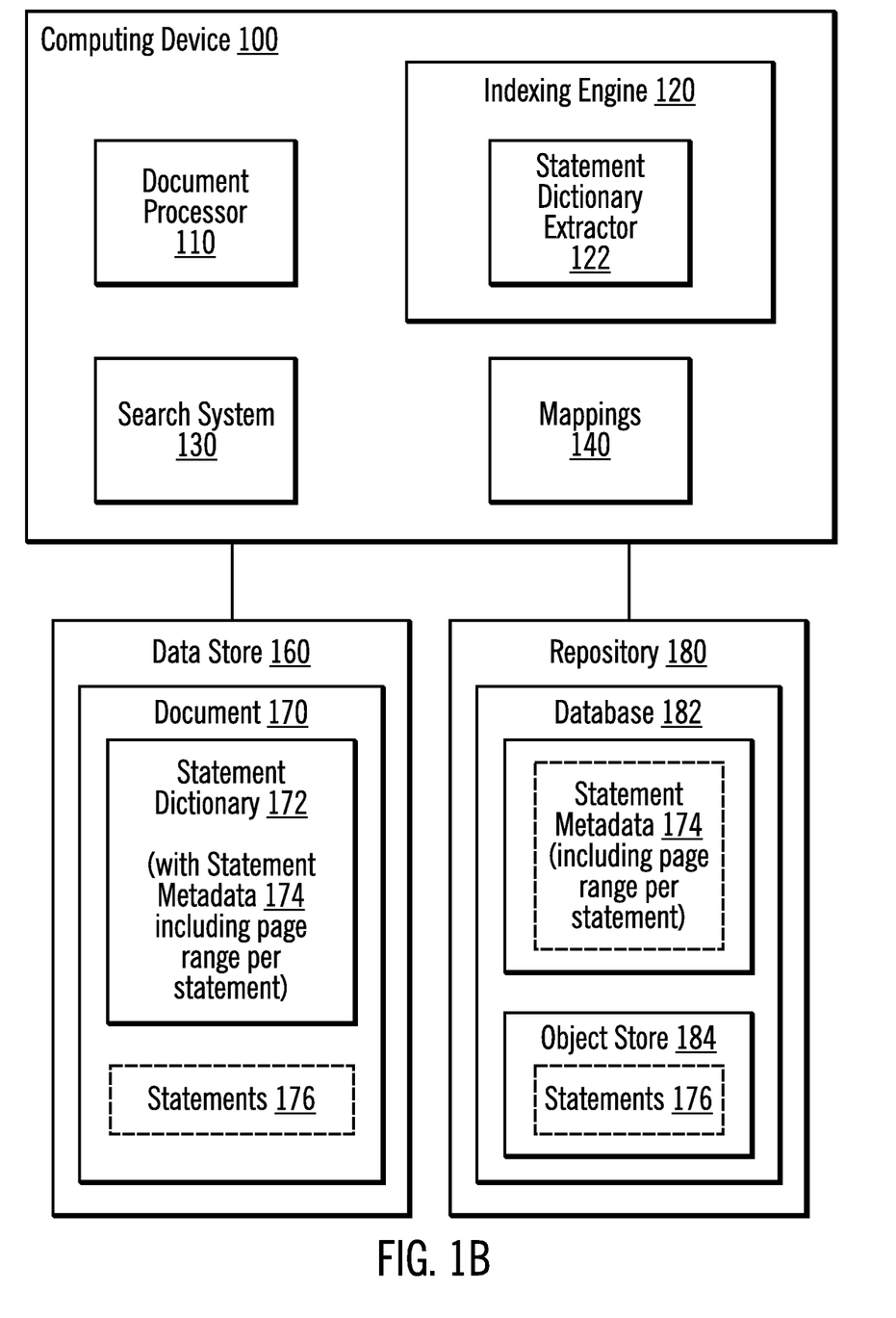
FIG. 1B illustrates, in a block diagram, a computing environment storing a statements extracted from document (without the document) in a repository in accordance with certain embodiments.

FIG. 1B illustrates, in a block diagram, a computing environment storing a statements extracted from document (without the document) in a repository in accordance with certain embodiments. A computing device 100 is coupled to a data store 160 and a repository 180. The computing device 100 includes a document processor 110, an indexing engine 120, a search system 130, and mappings 140. The indexing engine 120 includes a statement dictionary extractor 122. The data store 160 includes at least one document 170 that includes a statement dictionary 172 and statements 176 before the document 170 is indexed. The statement dictionary 172 includes statement metadata 174, including a page range for each of the statements 176. Moreover, the statement metadata 174 includes fields and values for each of the statements (e.g., a field may be a name of a customer, and the value is the customer's name). In certain embodiments, the statement metadata 174 is extracted and stored in a database 182 of the repository 180, while the statements 176 in the document 170 are extracted (using the page range in the statement metadata 174 of the statement dictionary 172) and stored in an object store 184. Such extraction may occur while indexing the document 170.

In certain embodiments, the document 170 may be a PDF document or an AFP document. In certain embodiments, the document processor 110 creates documents in PDF format, AFP format or other document formats. With embodiments, the document 170 may be described as having multiple statements 172 (e.g., customer statements), and there is one statement dictionary 176 for all of the statements in the document 170. In certain embodiments, the document 170 is a report with millions of statements.

In certain embodiments, a single statement dictionary resides in a single, pre-determined location of the document. In various embodiments, the pre-determined location may be within document metadata of the document, on a first page of the document, on a last page of the document, etc. In certain embodiments, the statement dictionary set is a non-graphical structure. In certain embodiments, the statement dictionary set has the following characteristics for a document:

1) The statement dictionary set is located in a structure associated with an area of a document. The area of the document is ignored (i.e., not observed) by applications processing the document, such as document readers, document converters, or other tools/applications that process the document, and the statement dictionary set is stored in this area. For example, PDF documents and AFP documents each have such an area that could contain the statement dictionary described herein.

2) The statement dictionary resides in the document without harming the integrity of the document or interfering with any application that may process the document (e.g., document readers and document converters). For example, this is true for PDF documents and AFP documents.

Embodiments remove the need to access each statement within a document (e.g., for archival) by creating a statement dictionary at the document level. This statement dictionary contains objects that describe each statement in the document. This allows the indexing engine 120 to open the document and read the statement dictionary to obtain the statement metadata and begin/end page numbers for each statement in the report.

Figure 2:
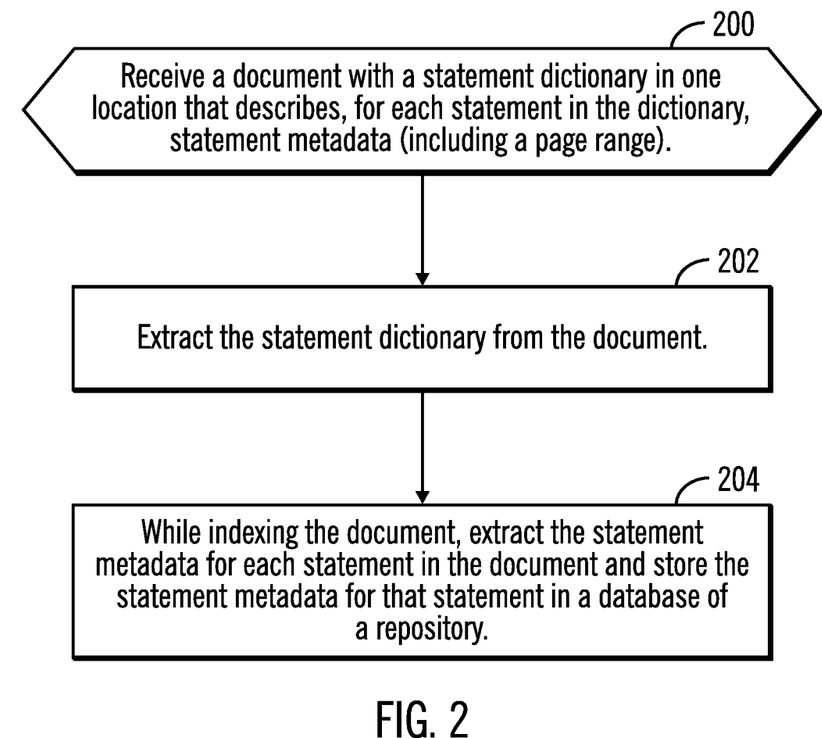
FIG. 2 illustrates, in a flow chart, operations for creation of a statement dictionary in accordance with certain embodiments.

FIG. 2 illustrates, in a flow chart, operations for creation of a statement dictionary in accordance with certain embodiments. Control begins at block 200 with, the document processor 110 receiving a document with a statement dictionary in one location that describes, for each statement in the dictionary, statement metadata (i.e., fields and values) including a page range (i.e., a beginning page number and an ending page number or a beginning page number and a number of pages). Such a document may be created in response to user input that identifies the statement dictionary and the statements to be included in that document.

In block 202, the statement dictionary extractor 122 extracts the statement dictionary from the document. In block 204, while indexing the document, the indexing engine 120 extracts the statement metadata for each statement in the document and stores the statement metadata for that statement in a database of a repository. For example, the statement metadata includes fields and values, along with a page range. The fields and values, along with the page range, are stored in a database table that may include: 1) columns for the fields (and values of the fields are stored in rows for that column) and 2) a column for the page range (and the value of the page range is stored in the rows for that column). The page range may be described as another field. The statement metadata may also include one or more fields that are used as an identifier of a statement, and such a field is a column of the database table. Then, when a search request with search keys is received, the search keys are compared to the fields/values stored in the database table to identify statements that should be returned in response to the search request.

With embodiments, the statement metadata for each statement comprises one or more fields and a value for each of the one or more fields. With embodiments, the page range comprises a beginning page number for that statement and an ending page number for that statement.

With embodiments, the document composition companies build a statement dictionary that is located in the document metadata. The location of the statement dictionary may be dependent on the data type. For example, for PDF the statement dictionary may be an embedded attached file.

The statement dictionary contains the statement metadata for each statement along with the beginning page number and the ending page number for that statement. Document composition companies have this information when they are building the document and are able to identify the statement dictionary information to the document processor 110.

Figure 3:
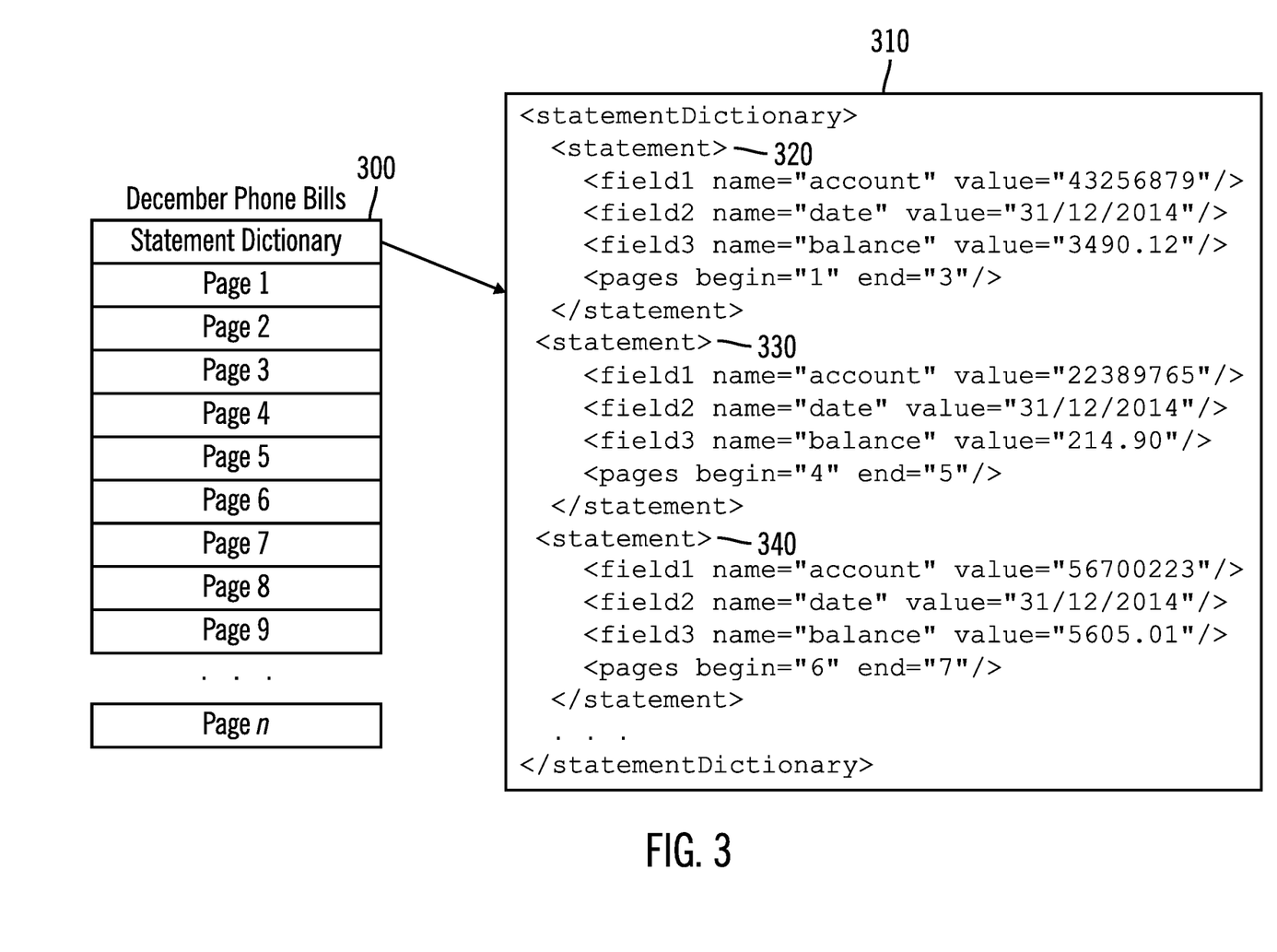
FIG. 3 illustrates an example statement dictionary in accordance with certain embodiments.

FIG. 3 illustrates an example statement dictionary 300 in accordance with certain embodiments. With embodiments, the statement dictionary is in an extensible markup language (XML) format. FIG. 3 illustrates an example statement dictionary 310 in accordance with certain embodiments. In FIG. 3, there is a December Phone Bills document with the statement dictionary 310, which may be inserted into the document 300 (e.g., inserted into a PDF report as an embedded attached file). The indexing engine 120 then opens the document 300 and reads the statement dictionary 310. All the statements in the document 300 may then be identified without navigating the entire document 300 (i.e., without accessing every page of the document). This removes a significant amount of processing and increases efficiency in processing statements within a document.

In FIG. 3, the statement dictionary 310 identifies a first statement 320 with three fields of "account", "date", and "balance", starting on page 1 and ending on page 3. The statement dictionary identifies a second statement 330 with three fields of "account", "date", and "balance", starting on page 4 and ending on page 5. The statement dictionary identifies a third statement 340 with three fields of "account", "date", and "balance", starting on page 6 and ending on page 7.

Figure 4:
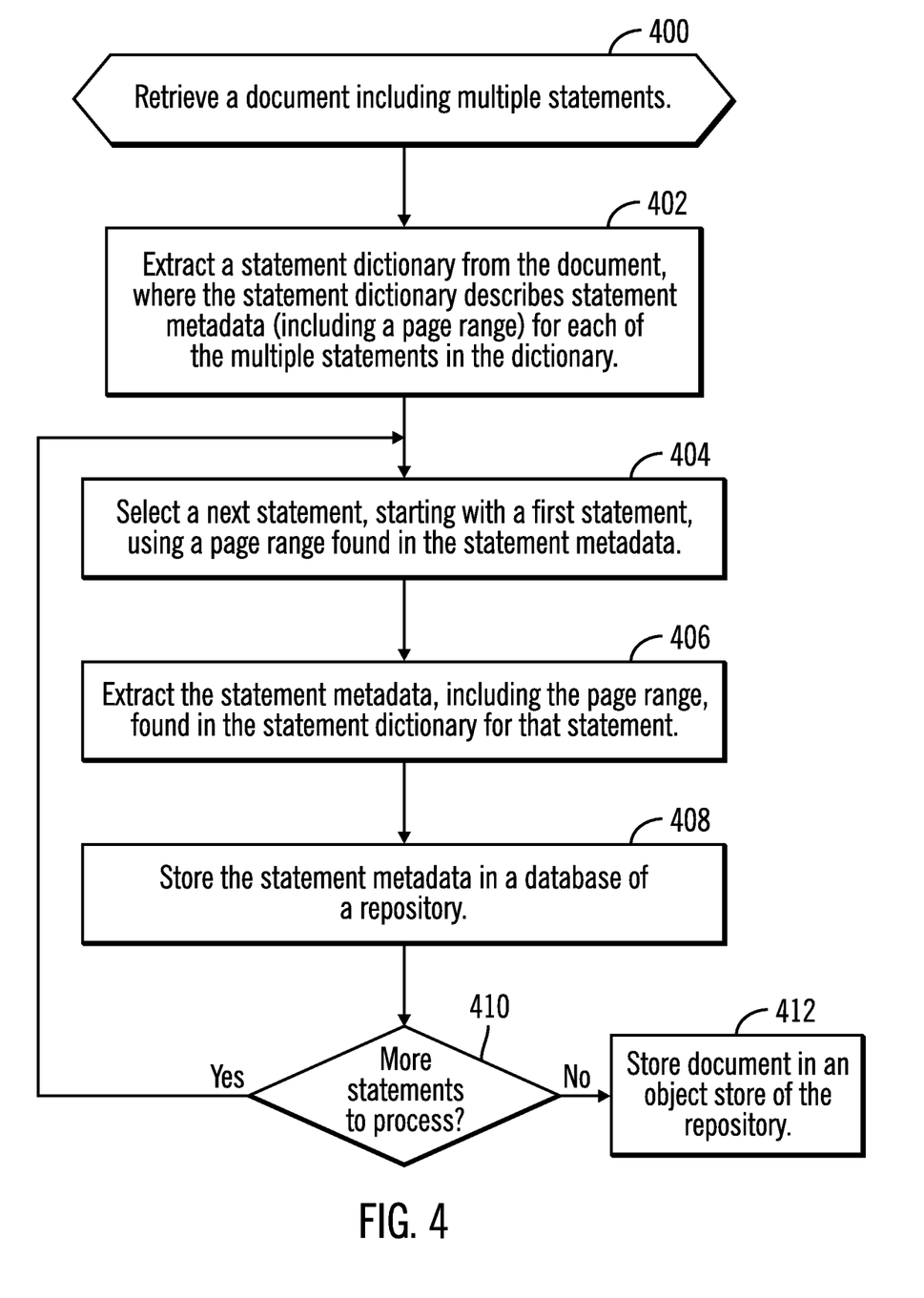
FIG. 4 illustrates, in a flow chart, operations for processing a statement dictionary that stores a document in a repository in accordance with certain embodiments.

FIG. 4 illustrates, in a flow chart, operations for indexing statements in a document in accordance with certain embodiments. Control begins at block 400 with the indexing engine 120 retrieving a document including multiple statements. In block 402, the indexing engine 120 extracts a statement dictionary from the document, where the statement dictionary describes statement metadata (including a page range) for each of the multiple statements in the dictionary. In block 404, the indexing engine 120 selects a next statement (of the multiple statements), starting with a first statement, using a page range found in the statement metadata. In block 406, the indexing system 120 extracts statement metadata, including a page range, found in the statement dictionary for that statement. In block 408, the indexing system 120 stores the extracted statement metadata in a database of a repository. In block 410, the indexing system 120 determines whether there are any more statements to process. If so, processing loops back to block 404 to select the next statement, otherwise, processing continues to block 412. In block 412, the indexing system 120 stores the document in an object store of the repository.

Figure 5:
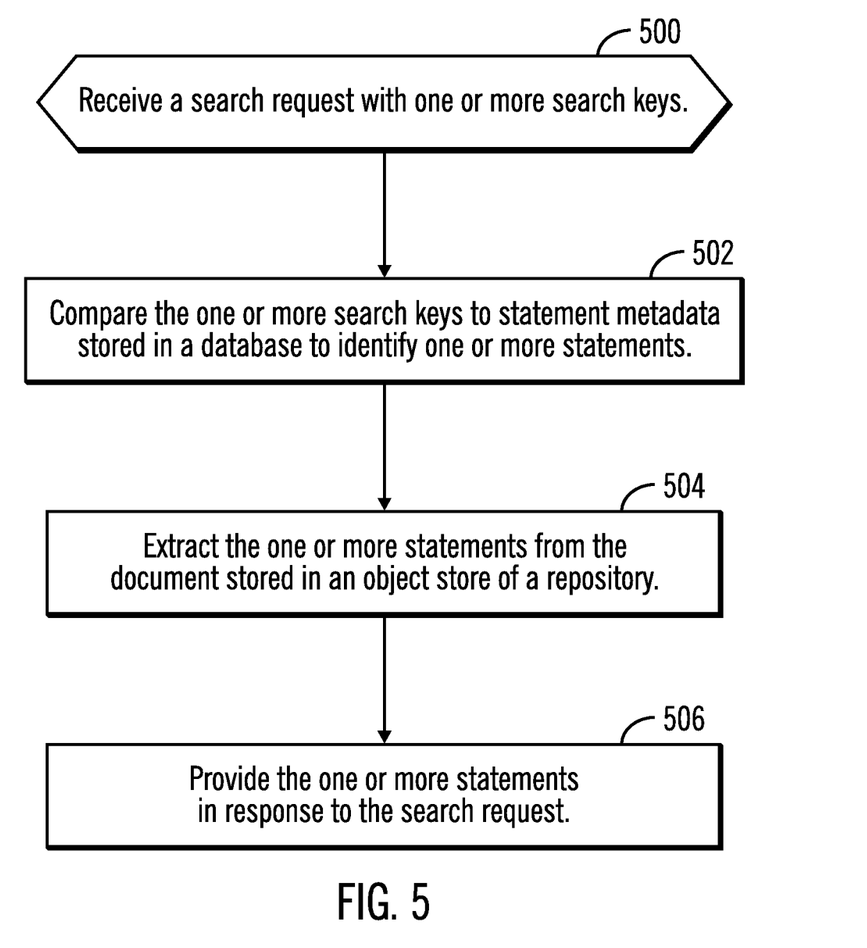
FIG. 5 illustrates, in a flow chart, operations for responding to a search request with one or more statements extracted from a document in accordance with certain embodiments.

FIG. 5 illustrates, in a flow chart, operations for responding to a search request with one or more statements extracted from a document in accordance with certain embodiments. Control begins at block 500 with the search system 130 receiving a search request with one or more search keys. In block 502, the search system 130 compares the one or more search keys to statement metadata stored in a database to identify one or more statements. That is, in certain embodiments, in response to determining that one or more of the search keys match at least a portion of the statement metadata for one or more statements, the search system 130 identifies the one or more statements. In block 504, the search system 130 extracts the one or more statements from the document stored in an object store of a repository. In block 506, the search system 130 provides the one or more statements in response to the search request.

Thus, as shown with FIGS. 4 and 5, in certain embodiments, such as an archive solution, the entire document is stored in the repository (as shown in FIG. 1A), and particular statements are retrieved from the document in response to search requests for those statements.

Figure 6:
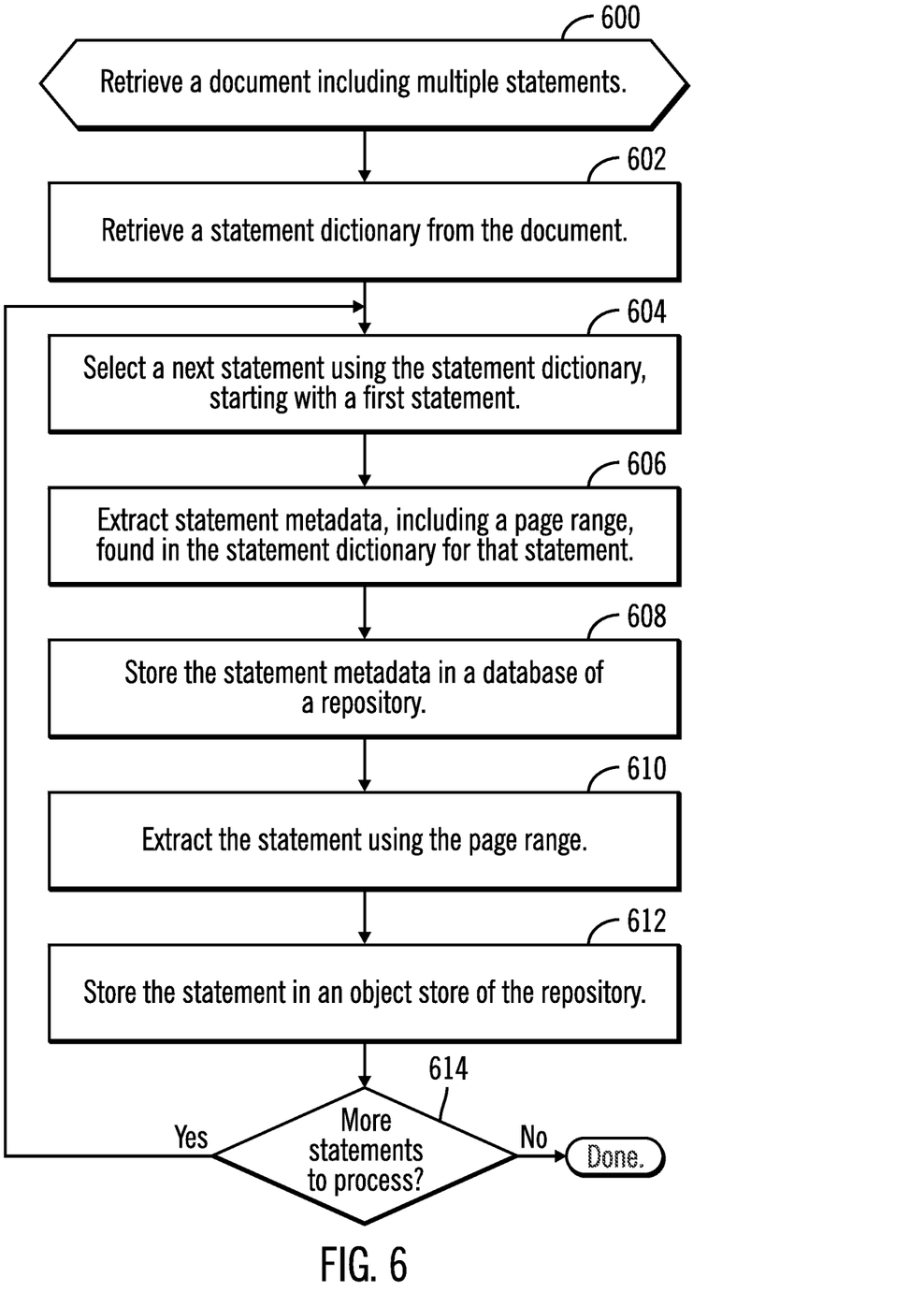
FIG. 6 illustrates, in a flow chart, operations for processing a statement dictionary that stores statements in a repository in accordance with certain embodiments.

FIG. 6 illustrates, in a flow chart, operations for archiving statements in a document in accordance with certain embodiments. Control begins at block 600 with the indexing engine 120 retrieving a document including multiple statements. In block 602, the indexing engine 120 retrieves a statement dictionary from the document. In block 604, the indexing engine 120 selects a next statement (of the multiple statements) using the statement dictionary, starting with a first statement. In block 606, the indexing system 120 extracts statement metadata, including a page range, found in the statement dictionary for that statement. In block 608, the indexing system 120 stores the extracted statement metadata in a database of a repository. In block 610, the indexing system 120 extracts the statement using the page range. In block 612, the indexing system 120 stores the statement in an object store of the repository. In certain embodiment, this processing archives the extracted statement. In block 614, the indexing system 120 determines whether there are any more statements to process. If so, processing loops back to block 604 to select the next statement, otherwise, processing is done.

Figure 7:
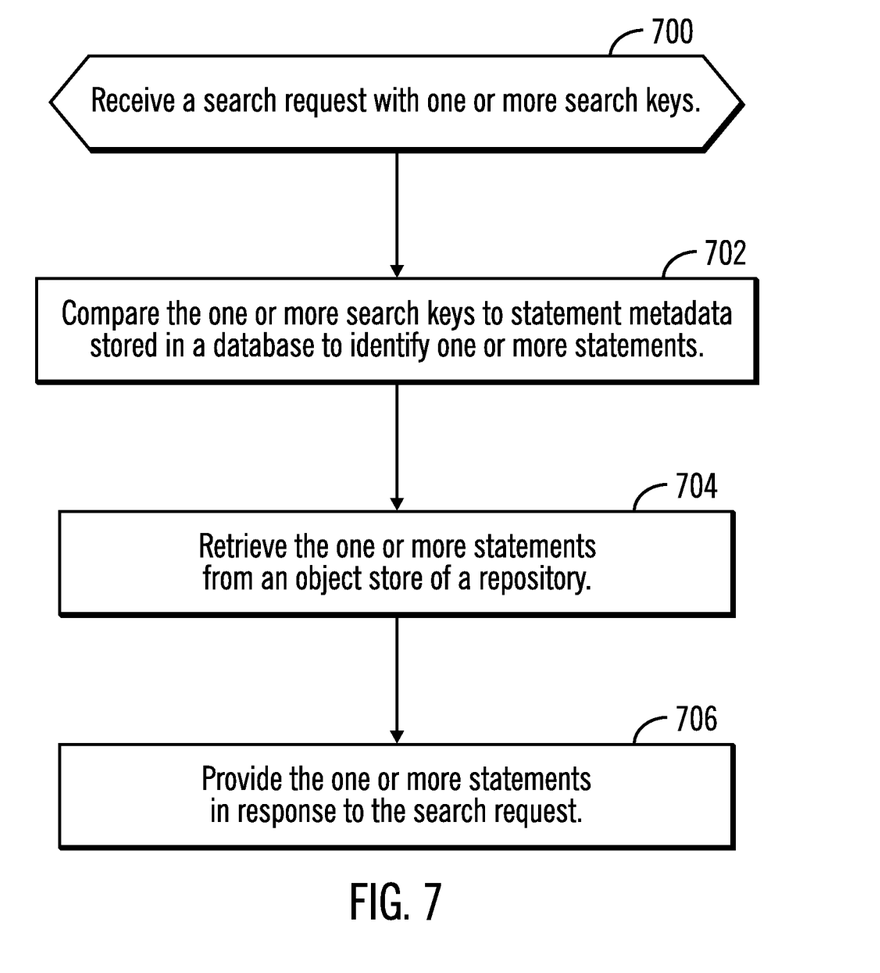
FIG. 7 illustrates, in a flow chart, operations for responding to a search request with one or more statements retrieved from a repository in accordance with certain embodiments.

FIG. 7 illustrates, in a flow chart, operations for responding to a search request with one or more statements retrieved from a repository in accordance with certain embodiments. Control begins at block 700 with the search system 130 receiving a search request with one or more search keys. In block 702, the search system 130 compares the one or more search keys to statement metadata stored in a database to identify one or more statements. That is, in certain embodiments, in response to determining that one or more of the search keys match at least a portion of the statement metadata for one or more statements, the search system 130 identifies the one or more statements. In block 704, the search system 130 retrieves the one or more statements from an object store of a repository. In block 706, the search system 130 provides the one or more statements in response to the search request.

Thus, as shown with FIGS. 6 and 7, in certain embodiments, statements extracted form a document stored in the repository (as shown in FIG. 1B), and particular statements are retrieved from the repository (not from the document as these statements were previously extracted from the document) in response to search requests for those statements.

Embodiments reduce the time required to archive extremely large reports. For example, such large reports may have millions of customer statements or other documents.

Using the statement dictionary, embodiments identify unique statements within a larger report using the beginning and ending page numbers of each statement.

Embodiments enable document generators to create a structure within the document that defines the statements contained within. This avoids the need to scan or evaluate the entire document for indexing and archiving.

Thus, embodiments perform indexing a document comprising a statement dictionary and one or more statements by extracting a statement metadata corresponding to each of the one or more statements from the statement dictionary; storing each statement metadata in a database; and, in response to a search request for a statement, retrieving the statement from the document using the corresponding statement metadata.

With embodiments, the statement dictionary is stored within the document. In certain embodiments, the statement is retrieved from the document; while, in certain other embodiments, the statement is retrieved from an object store. With embodiments, the statement is extracted from the document using a page range for the statement obtained from the statement dictionary.

Figure 8:
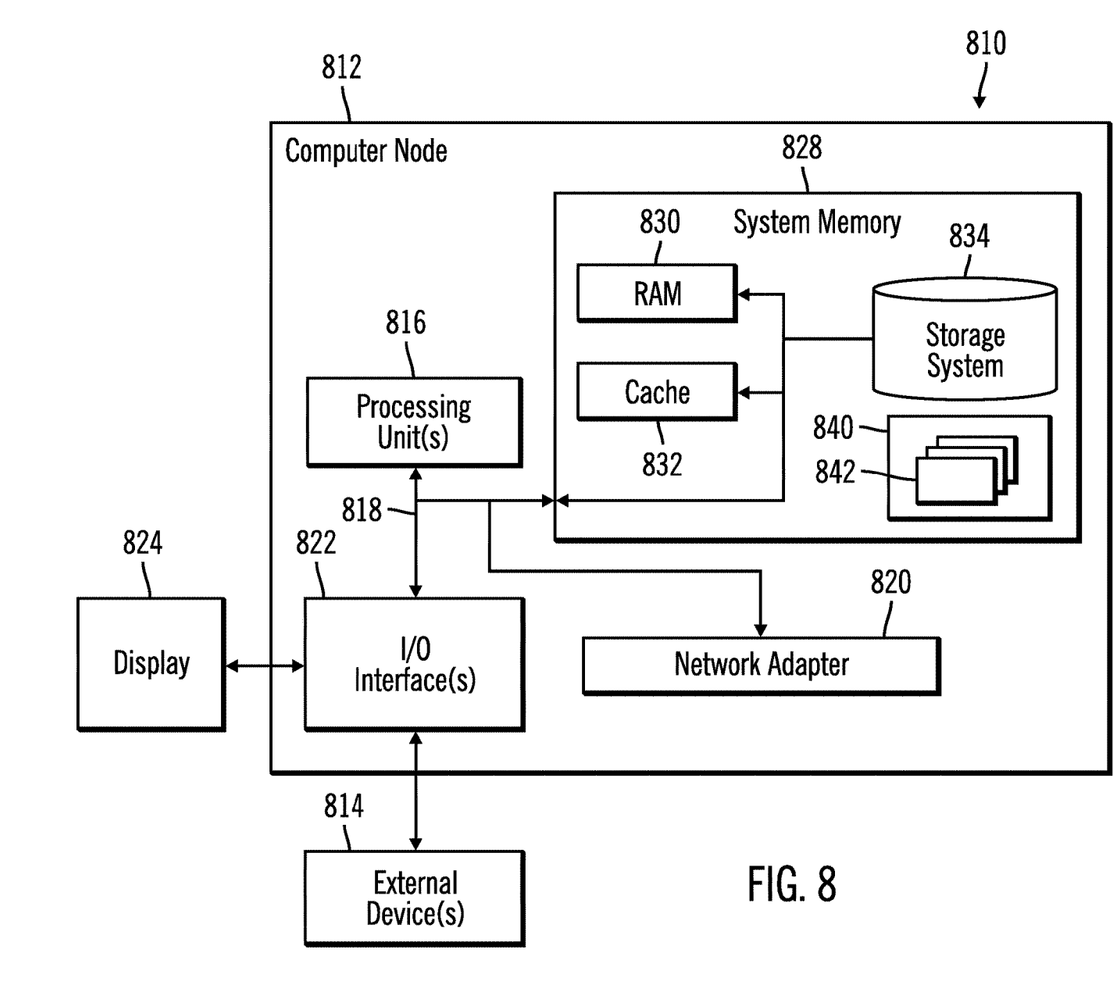
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 in cloud computing node 810 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the computing device 100 has the architecture of computer node 812. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
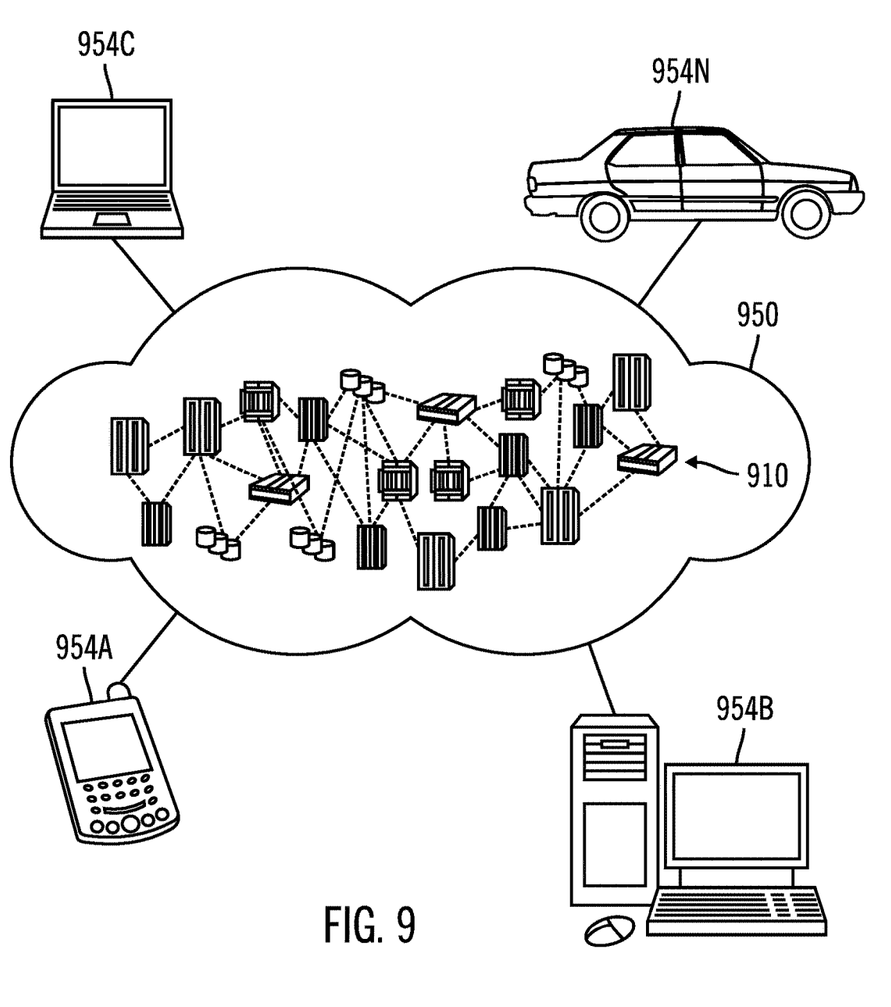
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
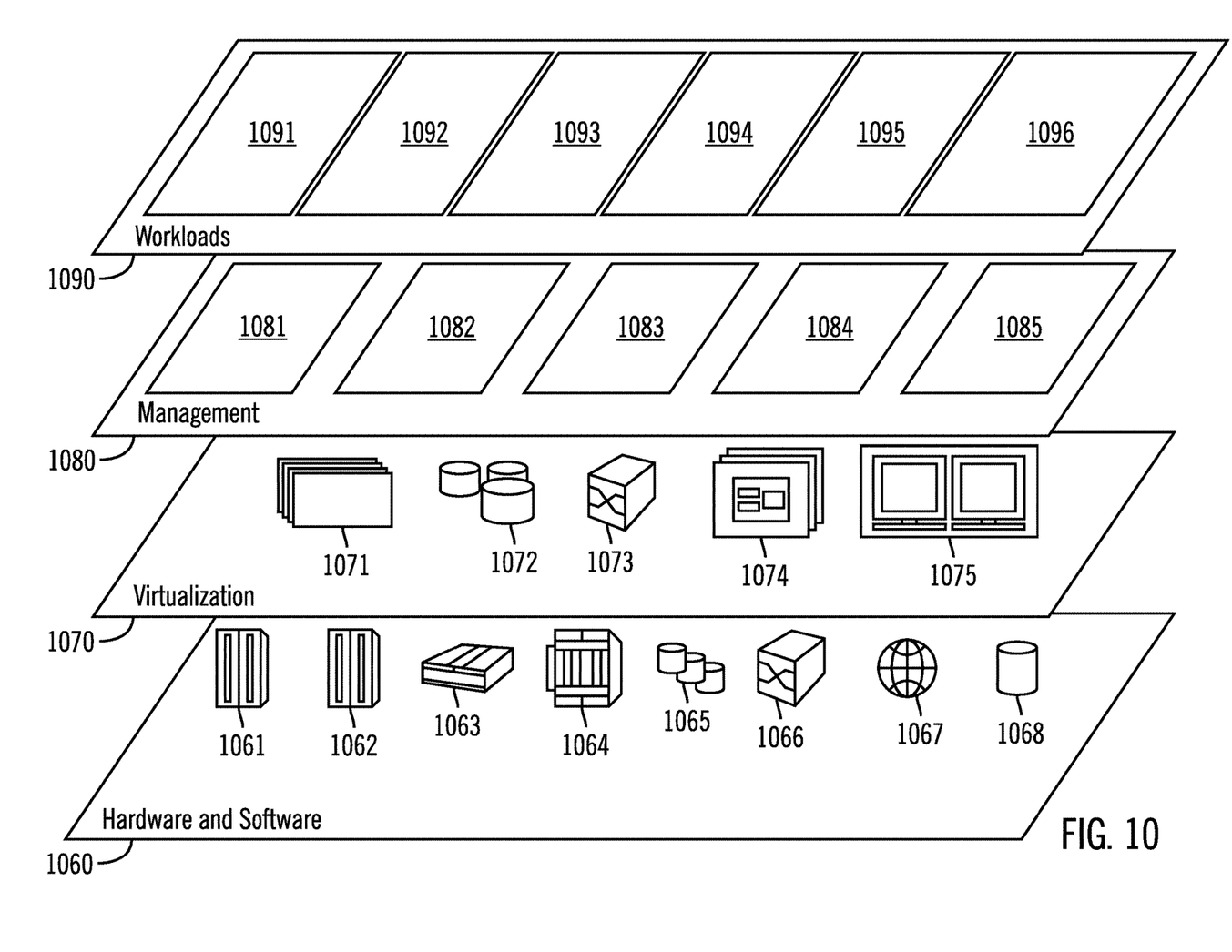
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and indexing and archiving multiple statements using a single statement dictionary in a document containing the multiple statements 1096.

Thus, in certain embodiments, software or a program, implementing indexing and archiving multiple statements using a single statement dictionary in a document containing the multiple statements in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   retrieving a document comprising one statement dictionary and a plurality of statements;
   extracting the statement dictionary from the document, wherein the statement dictionary comprises page ranges, and wherein each page range of the page ranges corresponds to a statement of the plurality of statements;
   for each page range of the page ranges in the statement dictionary,
      extracting a statement from the document and one or more values corresponding to the statement from the statement dictionary; and
      storing the statement and the one or more values corresponding to the statement; and
   retrieving a particular statement based on one or more search keys from a search request matching one or more values corresponding to the particular statement.

2. The computer-implemented method of claim 1, wherein the statement dictionary is ignored by an application processing the document for one of conversion and reading.

3. The computer-implemented method of claim 1, wherein the particular statement is retrieved from the document.

4. The computer-implemented method of claim 1, wherein the particular statement is retrieved from an object store.

5. The computer-implemented method of claim 3, wherein the one or more values correspond to one or more fields.

6. The computer-implemented method of claim 1, wherein a Software as a Service (SaaS) is configured to perform the operations of the computer-implemented method.

* * * * *